US007017492B2

(12) United States Patent
Seymour

(10) Patent No.: US 7,017,492 B2
(45) Date of Patent: Mar. 28, 2006

(54) COORDINATING THE FUNCTIONING OF A COLOR CONTROL SYSTEM AND A DEFECT DETECTION SYSTEM FOR A PRINTING PRESS

(75) Inventor: John C. Seymour, Jefferson, WI (US)

(73) Assignee: Quad/Tech, Inc., Sussex, WI (US)

( * ) Notice: Subject to any disclaimer, the term of this patent is extended or adjusted under 35 U.S.C. 154(b) by 0 days.

(21) Appl. No.: 10/385,311

(22) Filed: Mar. 10, 2003

(65) Prior Publication Data

US 2004/0177783 A1 Sep. 16, 2004

(51) Int. Cl.
*B41F 1/54* (2006.01)
*B41M 1/14* (2006.01)
*G06F 15/00* (2006.01)
*G06K 9/00* (2006.01)

(52) U.S. Cl. ...................... 101/484; 101/211; 101/183; 358/1.9; 382/112

(58) Field of Classification Search ................. 400/74; 101/171, 181, 483, 484, 211, 365; 358/1.9, 358/504, 509; 382/112; 356/73; 250/580
See application file for complete search history.

(56) References Cited

U.S. PATENT DOCUMENTS 4,488,808 A 12/1984 Kato ........................... 356/73
4,649,502 A 3/1987 Keller et al. ................. 358/1.9
4,852,485 A 8/1989 Brunner ....................... 101/211
4,852,604 A * 8/1989 Wales et al. ................ 137/392
5,058,175 A 10/1991 Aso ........................... 382/112
5,122,977 A * 6/1992 Pfeiffer ....................... 101/211
5,136,309 A * 8/1992 Iida et al. ....................... 347/7
5,258,925 A * 11/1993 Maier et al. ................ 382/112
5,357,448 A 10/1994 Stanford ...................... 382/112
5,384,859 A 1/1995 Bolza-Schunemann et al. .......................... 382/112
5,412,577 A 5/1995 Sainio et al. ............... 700/124
5,460,090 A * 10/1995 Pfeiffer et al.
5,533,139 A 7/1996 Parker et al. ............... 382/108
5,689,425 A 11/1997 Sainio et al. ............... 700/124
5,724,259 A 3/1998 Seymour et al. ............ 382/199
5,724,437 A * 3/1998 Bucher et al.
5,802,978 A * 9/1998 Geissler et al. ............. 101/484
5,816,164 A * 10/1998 Loffler ........................ 101/484
5,848,189 A 12/1998 Pearson et al. ............. 382/218
5,903,712 A * 5/1999 Wang et al. ................. 358/1.9
5,956,080 A 9/1999 Tsunemine ................... 348/93
5,967,049 A 10/1999 Seymour et al. ............ 101/484
5,967,050 A 10/1999 Seymour .................... 101/484
5,999,636 A 12/1999 Juang ......................... 382/112
6,002,433 A * 12/1999 Watanabe et al. ........... 348/246

(Continued)

FOREIGN PATENT DOCUMENTS

EP 0 767 059 A2 2/1996

*Primary Examiner*—Daniel J. Colilla
*Assistant Examiner*—Wasseem H. Hamdan
(74) *Attorney, Agent, or Firm*—Michael Best & Friedrich LLP

(57) ABSTRACT

A method of coordinating the utilization of a color control system and a defect detection system on a printing press includes acquiring image data and processing the data by a comparison to template image data and the generation of color error data and print defect data. The method further includes the steps of selectively enabling and disabling the color control system and selectively enabling and disabling the defect detection system based upon the color error data and the print defect data.

13 Claims, 8 Drawing Sheets

U.S. PATENT DOCUMENTS

| | | | | |
|---|---|---|---|---|
| 6,031,931 | A | 2/2000 | Chiu et al. | 382/141 |
| 6,041,708 | A * | 3/2000 | Kipphan et al. | 101/365 |
| 6,112,658 | A | 9/2000 | Gunther et al. | 101/171 |
| 6,115,512 | A | 9/2000 | Tsukamoto et al. | 382/312 |
| 6,119,594 | A | 9/2000 | Kipphan et al. | 101/365 |
| 6,142,078 | A | 11/2000 | Lachajewski | 101/484 |
| 6,178,254 | B1 | 1/2001 | Rappette et al. | 382/112 |
| 6,244,174 | B1 * | 6/2001 | Sirowitzki et al. | 101/212 |
| 6,373,964 | B1 | 4/2002 | Geissler et al. | 382/112 |
| 6,397,745 | B1 * | 6/2002 | Koehler | 101/366 |
| 6,401,612 | B1 * | 6/2002 | Koehler | 101/365 |
| 6,450,097 | B1 * | 9/2002 | Kistler et al. | 101/483 |
| 6,619,206 | B1 * | 9/2003 | Koehler | 101/364 |
| 6,679,171 | B1 * | 1/2004 | Mayer et al. | 101/484 |
| 6,698,355 | B1 * | 3/2004 | Fukui | 101/485 |
| 6,782,814 | B1 * | 8/2004 | Tokiwa | 101/211 |
| 2003/0005841 | A1 | 1/2003 | Riepenhoff | 101/484 |

* cited by examiner

| Inputs | | | Outputs | |
|---|---|---|---|---|
| Previous prediction | Current error ($\delta$) | Predicted error ($\varepsilon$) | Color control output | Defect detect output |
| Large | Large | Large | Disabled | Enabled |
| Large | Large | Small | Enabled | Disabled |
| Large | Small | Small | Enabled | Enabled |
| Small | Large | Large | Disabled | Enabled |
| Small | Large | Small | Disabled | Disabled |
| Small | Small | Small | Enabled | Enabled |

Figure 9

COORDINATING THE FUNCTIONING OF A COLOR CONTROL SYSTEM AND A DEFECT DETECTION SYSTEM FOR A PRINTING PRESS

FIELD OF THE INVENTION

The present invention relates generally to a control system for a printing press, and more particularly, to coordinating the functioning of a color control system and a defect detection system for a printing press.

BACKGROUND OF THE INVENTION

A web-offset printing press includes an inking assembly for each color of ink used in the printing process. Each inking assembly includes an ink reservoir and a plurality of hard nylon keys or a segmented blade disposed along the outer surface of an ink fountain roller. The amount of ink supplied to a roller train of the press and ultimately to a substrate, such as a web of paper, is adjusted by changing the spacing between the edge of the blade segments or the nylon keys and the outer surface of the ink fountain roller. The position of each blade segment or each key relative to the ink fountain roller is independently adjustable via an ink control system to thereby control the amount of ink fed to a corresponding longitudinal strip or ink key zone of the substrate.

Typically, ink is spread laterally from one longitudinal zone to adjacent zones due to the movement of vibrator rollers, which oscillate in a lateral direction relative to the substrate. The amount of ink on the ink fountain roller itself is also adjustable by changing the angle through which the ink fountain roller rotates each stroke. This generally occurs by adjusting a ratchet assembly, as is known in the art.

While such a printing press is running, a camera is typically used to continually monitor the printed output and to make appropriate ink key adjustments in order to achieve appropriate quality control of the color of the printed image. Specifically, the camera moves across the web to collect images of color patches on the moving web. Each pixel of the color patch images is then processed, and assigned a color value. Each color value is compared against a desired color value. If the absolute difference between the desired color value and the determined color value is outside some predetermined tolerance, the ink key is then controllably adjusted, thereby effecting a change in the ink flow rate.

It is not uncommon for printed images on the web, color patches in particular, to be corrupted by some printing artifact such as the effect of a paper fiber on the blanket roller (commonly known as a hickey), a droplet of ink, an indentation on the blanket, a slime hole in the paper, a scratch on the plate, or some other such defect. In this case, the measured color values of a defective color patch may not accurately reflect the color within the printed work itself. While methods for detecting a small defect in a color patch exist in marked color control systems, they are generally limited to eliminating small defects that do not encompass a relatively large portion of the color patch. Furthermore, these color control systems use techniques that assume that the color properties of the printed work remain constant over a defined area. However, the color properties of the print work may not remain constant. As a result, other techniques are needed to detect defects.

Color control systems for printing presses not requiring the use of color patches, or markless color control systems have been developed. Such markless color control systems measure color values in the printed work itself. Since the color of the printed work is measured directly in the markless systems, the correspondence between color patches and the work is not in question. However, these systems do not detect defects on the printed work. Even though the marked color control systems are configured to detect defects in the printed work, these defect detection techniques are applied to marked color control systems only.

For example, printing presses typically include a defect detection system as are known in the art. This type of defect detection system scans, and acquires an image of the printed web. The acquired image is subsequently compared to a stored digital template image. Any discrepancy between the acquired image and the template image beyond some tolerance is considered to be a defect. The isolated defects are then logged in a data file. When the systems detect a large change in color due to a change in inking level, a non-isolated defect is reported over a large portion of the web. When non-isolated defects are reported, an alarm will subsequently be set off to alert an operator to take appropriate corrective action.

Once a printed product is determined to be acceptable, the defect detection control systems will typically establish a new template image by scanning the acceptable printed product. The defect detection control system is not fully functional until a printed product is determined acceptable. While a template image can be collected before the printed product is considered acceptable, the template image may actually contain a defect, and an actual defective image may be considered acceptable or good, and therefore no corrective action is taken.

Furthermore, the printed product may have subtle defects even when it is judged acceptable. For example, a printing plate may have been scratched before the printing process started, or a blanket flaw such as a hickey or indentation may have been present.

The makeready process typically includes a visual comparison and inspection of a print product against a contract proof. This visual comparison and inspection process establishes that no formatting errors are introduced into the press between making the contract proof and putting the printing plates on press. However, typical defect detection control systems do not allow for a template image that has been collected based on a contract proof, or based on a digital representation of the printed work that was used to create the printing plate.

Traditionally, color control systems and defect detection control systems are two separate systems operating on a printing press. These separate systems utilize separate web scanning mechanisms. Image processing is often duplicated in these two control systems as well.

SUMMARY OF THE INVENTION

The invention provides a control system for a printing press. The control system includes a color control subsystem and a defect detection subsystem. The two subsystems are preferably adapted to share data obtained from the printing press and are preferably implemented using a single scanner assembly and a single processor.

The invention further provides a control system for a printing press which includes a color control subsystem, a defect detection subsystem, and an integration subsystem in operational communication with the two other subsystems. The integration subsystem selectively enables and disables the outputs of the color control subsystem and the defect detection subsystem based upon data acquired from the printed work on the printing press.

The invention also provides a method of coordinating the utilization of a color control system and a defect detection system on a printing press. The method includes acquiring data from a printed work on a printing press, processing the data in a defect detection system or in the color control system to determine if color errors or print defect errors exist, determining when to selectively enable or disable the color control system and/or the defect detection system based upon the processed data and thereafter enabling or disabling the color control system or the defect detection system.

Other features and advantages of the invention will become apparent by consideration of the detailed description and accompanying drawings.

BRIEF DESCRIPTION OF THE DRAWINGS

FIG. 9 is a table indicating input and output rules.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

DETAILED DESCRIPTION OF THE PREFERRED EMBODIMENTS

Figure 1:
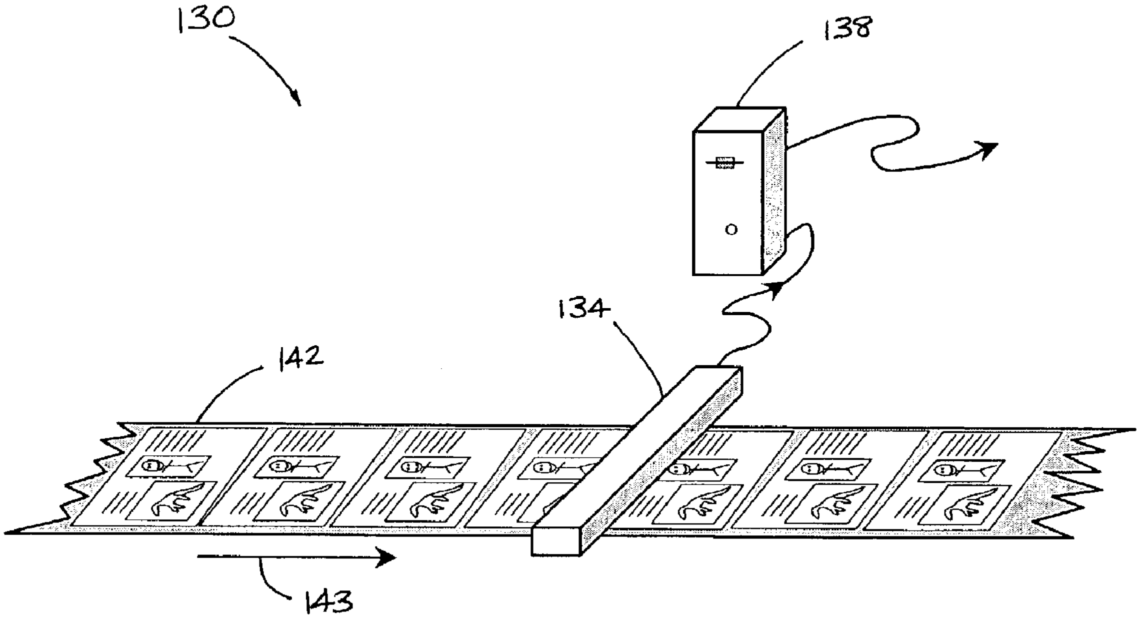
FIG. 1 is a perspective view of a portion of a printing press.

A control system 130 according to the present invention is shown in FIG. 1. The control system 130 includes a single scanner assembly 134 for both color control and defect detection purposes, and a single system processor 138. The scanner assembly 134 collects image data from a web 142 moving in a direction 143. Once collected, the acquired image data is transferred to the processor 138 for processing in a color control subsystem and a defect detection subsystem. Such processing includes color control, such as ink level adjustment, and defect detection. The ink level adjustment information is then communicated to the associated printing press to effect a change in ink level when deemed necessary as is known in the art.

Figure 2:
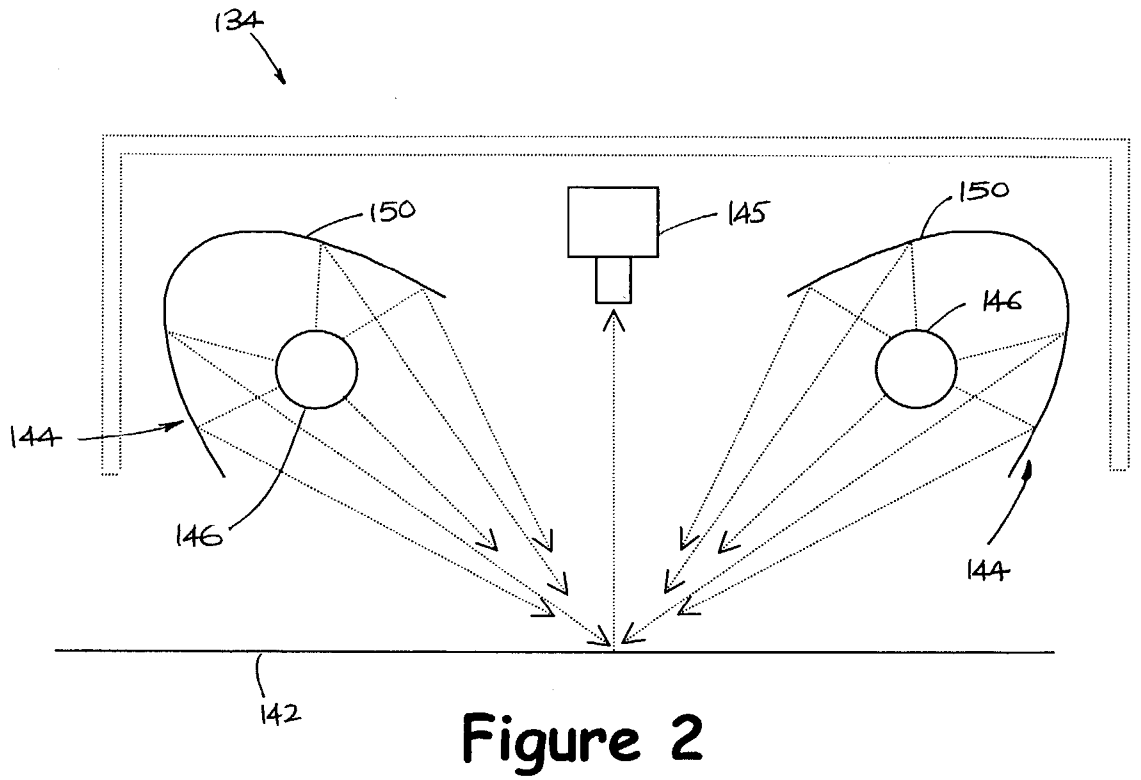
FIG. 2 is a side view of a scanner assembly.

Generally, the scanner assembly 134 includes a lighting element or a light source which illuminates the moving web 142, an image sensor which senses reflected light from the moving web 142, and any associated optic elements required to appropriately disperse the illumination or direct light to the image sensor. Referring now to FIG. 2, a preferred scanner assembly 134 is shown. The scanner assembly 134 includes a pair of light sources or lighting elements 144 located upstream and downstream from an image sensor 145. Each lighting element 144 further includes an illuminator 146, arranged substantially parallel to the moving web 142 and substantially perpendicular to the direction 143, and a reflector 150.

The illuminator 146 provides illumination to the web 142 with a pair of fluorescent bulbs, for example. As the web 142 moves, an encoder signal from the printing press drives a shutter mechanism to trigger acquisitions of data. At each acquisition, the image sensor 145 senses a portion of the efflux light that is reflected from the web 142.

When high-speed web or fine resolution printing is desired, the illuminator 146 is typically powered by a high frequency power supply to maintain a relatively constant strength of illumination from one image line to the next. In the preferred embodiment, the illuminator 146 is a tube-shaped halogen bulb with a filament running parallel to the web 142. The tube-shaped halogen bulb typically provides illumination stability until its point of failure, and the filament provides substantially uniform illumination across the web 142. Other illumination device such as a series of conventional incandescent bulbs may also be used.

Figure 3:
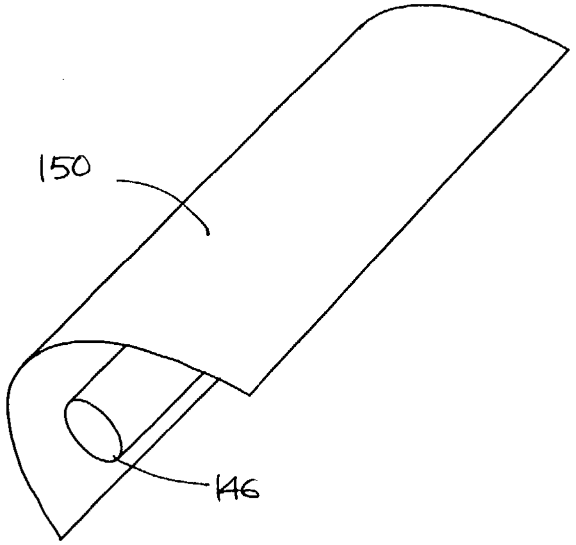
FIG. 3 is a perspective view of a lighting element of the scanner assembly.

Referring now to FIGS. 2–3, the reflector 150 is shown which is utilized to make efficient use of light. The reflector 150 extends substantially parallel to the illuminator 146. In the preferred embodiment, the reflector 150 has a general shape of a part of an ellipse 154, which has two foci 158, 162. The illuminator 146 is substantially aligned at the first focus 158. The second focus 162 is generally at a point on or just above the web 142 and below the image sensor 145. The two reflectors 150 are aligned such that the second focus 162 of each reflector 150 is substantially coincident.

Figure 4:
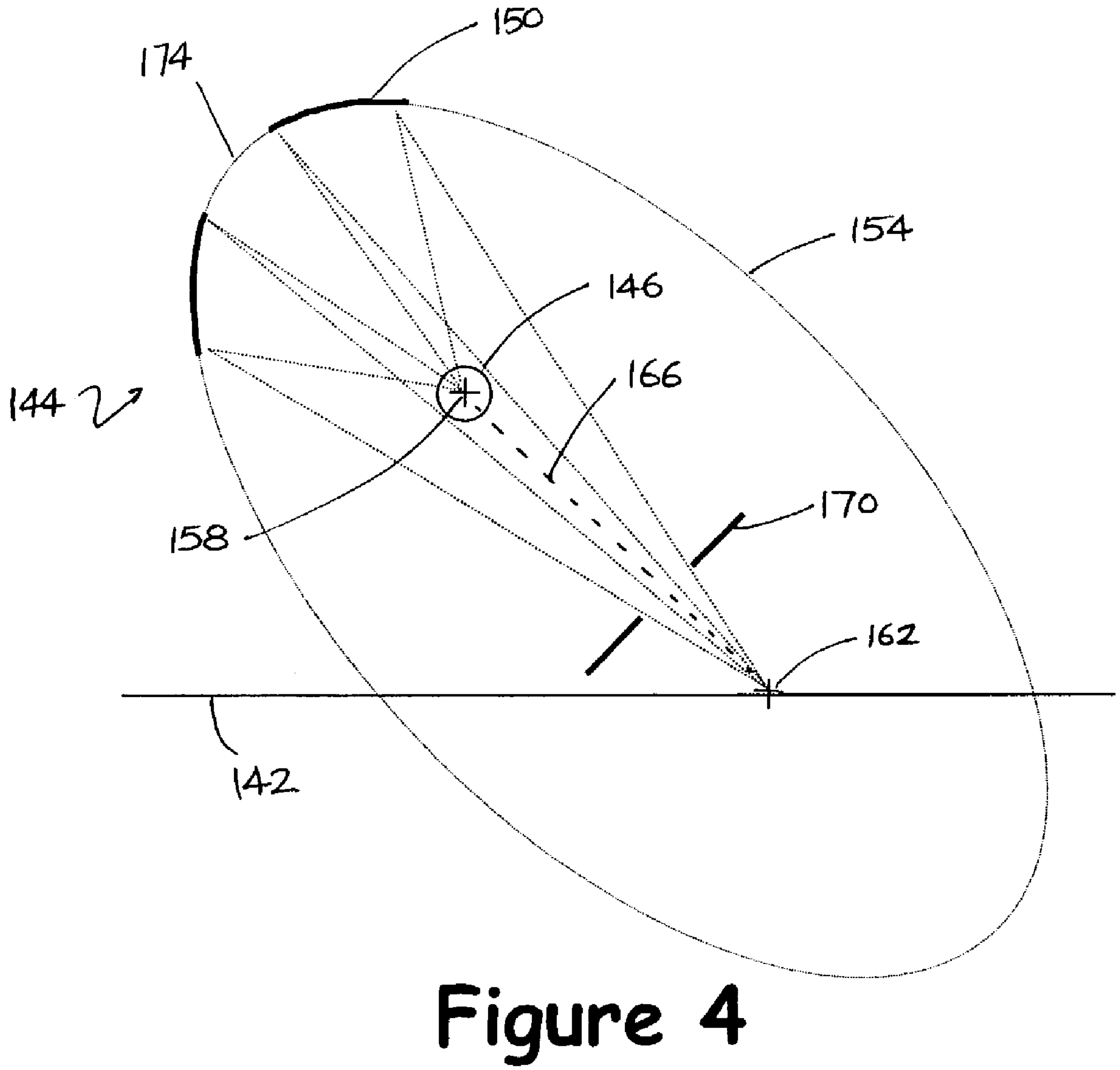
FIG. 4 is a sectional view of the lighting element with a slit aperture.

FIG. 4 shows another embodiment of the lighting element 144. The illuminator 146 as shown in FIG. 4 is positioned such that a 45° angle is made between the web 142 and a line 166 connecting the two foci 158, 162. A slit aperture 170 is placed near the focus 162 to obstruct the light that impinges the web 142 at an angle substantially different from 45°. The reflector 150 is designed to utilize only the reflected light that passes through the aperture 170. The reflector 150 includes a blind spot 174. The light reflected from the blind spot 174 generally does not pass through the aperture 170. The blind spot 174 is preferably given a flat black finish to absorb a significant portion of the light from the illuminator 146. If the reflector 150 is left reflective at the blind spot 174, the light that leaves the illuminator 146 toward the blind spot will be reflected back through an illuminator surface. Since the reflected light does not re-enter perpendicular to the illuminator surface, the illuminator surface subsequently refracts and scatters the reflected light. Thus, the blind spot 174 is preferably darkened.

The lighting elements 144 are preferably packaged in an enclosure such that all the light emitting from the enclosure leaves through the aperture 170. The interior walls of the enclosure preferably have a black finish, or are baffled as necessary to reduce stray light.

Figure 5:
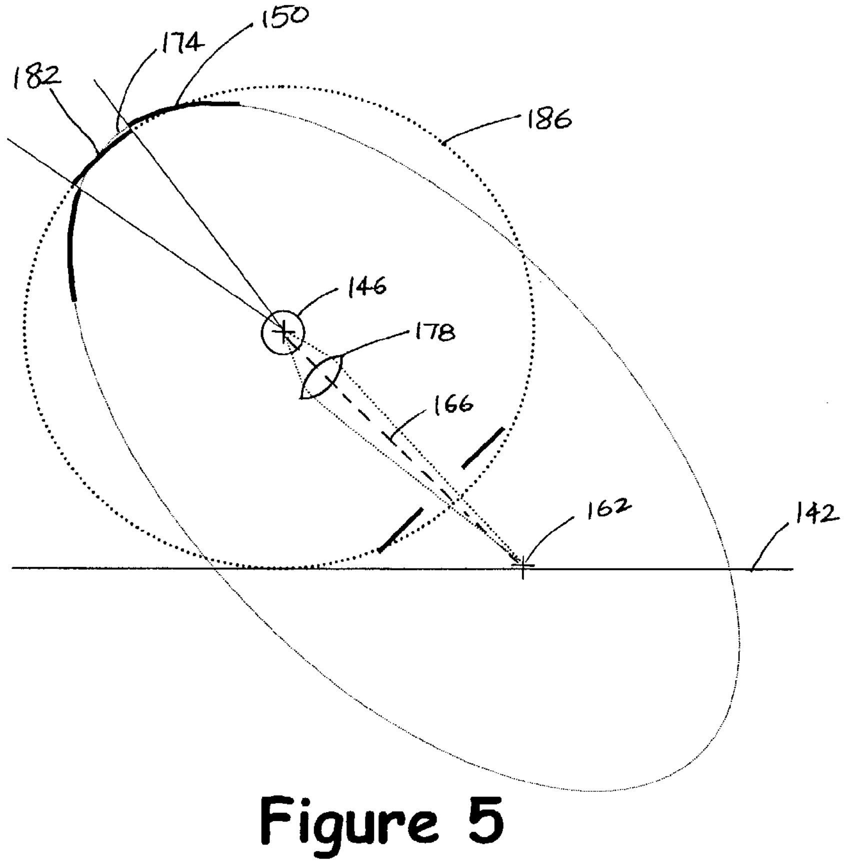
FIG. 5 is a sectional view of an alternative embodiment of the lighting element.

To increase the utilization of light energy, and as shown in FIG. 5, a lens 178 is placed between the reflector 150 and the web 142 to increase the amount of light focused at the focus 162 on the web 142. The illumination directly from the illuminator 146 at or about 45° toward the web 142 typically spreads and covers a wide swath on the web 142. The lens 178 is placed such that the lens focus and the focus 162 are generally coincident. The lens 178 focuses the direct illumination into the same line as the elliptical reflected light. The size and placement of the lens are also chosen such that there is no interference between the lens 178 and the reflected light paths.

A circular reflector 182 centered at the first focus 158 is positioned at the blind spot 174. The illumination proceeds from the illuminator 146 to the circular reflector 182. From the circular reflector 182, the illumination is reflected back through the illuminator 146 and further to the lens 178, which focuses the illumination on the web 142.

If the distance between the circular reflector 182 and the illuminator 146 is approximately the same as the distance between the elliptical reflector 150 and the illuminator 146, the circular reflector 182 and the elliptical reflector 150 can be fabricated as a single extruded assembly. In this way, the blind spot no longer requires darkening. Both the circular reflector 182 and the elliptical reflector 150 are preferably mirrors, polished enough in order to reflect nearly all the illumination as gloss, but with bumpy surfaces on a millimeter scale such that a filament image is not projected on the web 142.

Figure 6:
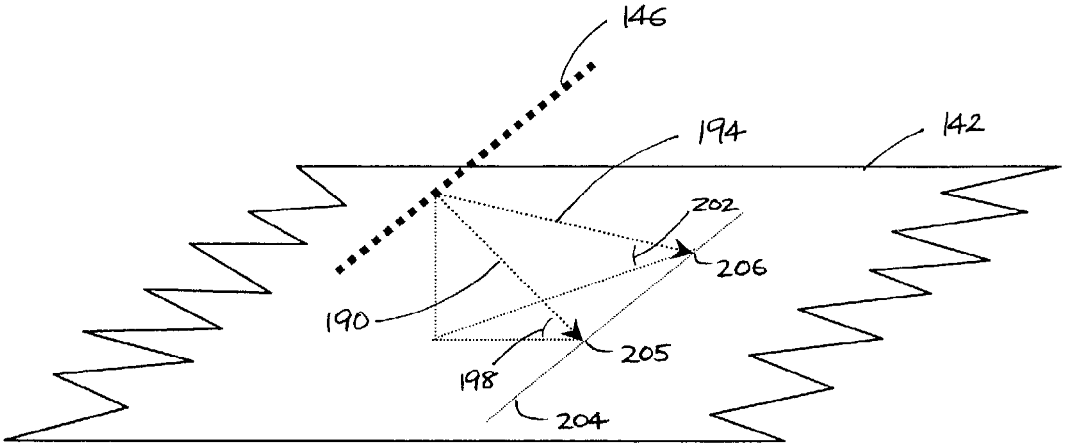
FIG. 6 is a perspective view of the lighting element emitting light from a single point.

It may be beneficial for the angle created between the web 142 and the straight line 166 formed between the foci 158, 162 to be slightly greater than 45°. As shown in FIG. 6, two light rays 190, 194 emanate from a single point on the illuminator 146 onto the web 142 thereby defining two angles 198, 202 between the light rays 190, 194 and the web 142. The two rays 190, 194 also impinge a scan line 204 on the web 142 at two points 205, 206. The first light ray 190, from the illuminator 146 to point 205, is on a plane that is perpendicular to the illuminator 146. The first angle 198 is 45°, which is appropriate for the desired geometry. The second light ray 194, from the illuminator 146 to point 206 away from point 205 of the scan line 204, is not on the plane perpendicular to the illuminator 146. As a result, the second angle 202 is shallower than 45°. That is, there is a bias toward the light rays that impinge the web 142 at shallower angles than the desired 45°. Consequently, to achieve the 45° desired geometry on average, the angle between the web 142 and the foci 158, 162 is increased by tilting the lighting elements 144 to allow for angles between the web 142 and the line between the foci 158, 162 to be non-ideal, that is, slightly greater than 45°.

Figure 7:
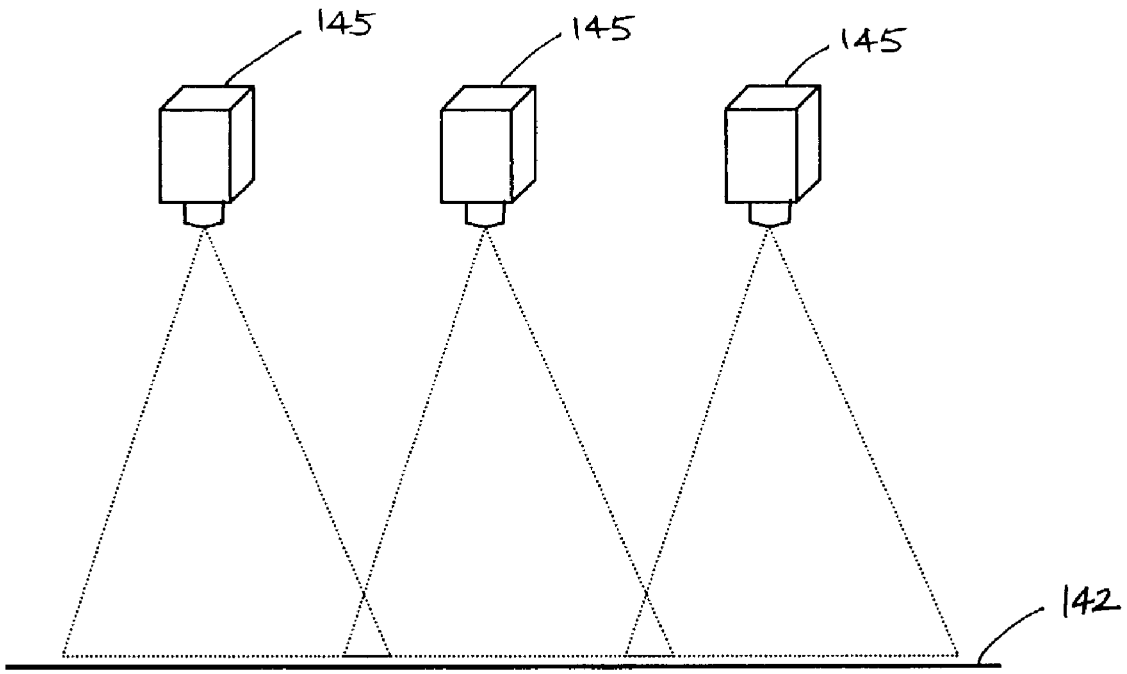
FIG. 7 is a perspective view of an image sensor arrangement.

Turning to FIG. 7, the scanner assembly 134 preferably includes a plurality of image sensors 145 such as linescan cameras. Each image sensor 145 generally covers a specific scan area on the web 142. The image sensors 145 are generally arranged laterally across the web 142. The number of image sensors 145 is generally application dependent. For example, a single image sensor 145 may adequately cover the web 142 in one application, but more than one image sensor 145 may be required to span the web 142 in another. In an application where a plurality of image sensors 145 is required, partial overlapping of the scan areas may be necessary to ensure complete web coverage.

Each image sensor 145 preferably includes a plurality of independent image channels. In one embodiment, there are three channels responsive generally to the wavelength ranges 400 to 500 nanometers, 500 to 600 nanometers, and 600 to 700 nanometers. These three channels are referred to as the blue, green and red channels, respectively. If the densitometric fidelity is more important than the colorimetric fidelity in the print work, the spectral responsivity of the three channels will be designed to comply with the definitions of Status T or Status E as defined in ISO 5-3, or with the German standard DIN 16536, for example.

If the colorimetric fidelity is more important than the densitometric fidelity, the three channels would be designed to meet the Luther-Ives condition. Spectral responsivities that meet the Luther-Ives condition are 1) spectral responsivities that are each a linear combination of the tristimulus functions, as defined in ISO 15-2, and 2) spectral responsivities that span the three-space of the tristimulus functions.

If no adequate compromise between densitometric fidelity and colorimetric fidelity can be found with three channels, a set of more than three channels may be necessary.

With respect to spatial resolution, requirements are typically application dependent. Applications requiring a high quality of inspection typically require extremely fine resolution. Applications requiring only detection of image defects that are readily apparent to a observer do not require extremely fine pixel resolution. In the preferred embodiment, an image pixel resolution of 75 DPI is chosen for example. A resolution of 75 DPI is sufficient to detect defects that are readily apparent to the human eye at arms length, and it is also a resolution sufficiently coarse that halftone screens typically used on commercial print product will not be imaged as moiréë patterns.

If the requirements for the defect detection subsystem and the color control subsystem are sufficiently different, or an image sensor with higher resolution is preferred for reasons of availability or cost, it is possible to re-sample an image to a different resolution for one or both of the subsystems. Specifically, a full resolution image is first blurred in a manner consistent with the amount of size reduction, and the image is subsequently decimated to produce a down-sampled image. Decimation is a process in which a set of data sampled at an original sampling rate is down-sampled at a lower sampling rate thereby producing a down-sampled set of data. The decimation process occasionally introduces staircase-like aberrations on sharp slanted lines. Increased smoothing or combining decimation with bilinear interpolation or any other suitable interpolation procedure typically reduces the staircase effect. Since decimation can be performed without applying the initial blurring process to all pixels, both decimation and blurring are combined to form a more efficient operation.

Figure 8:
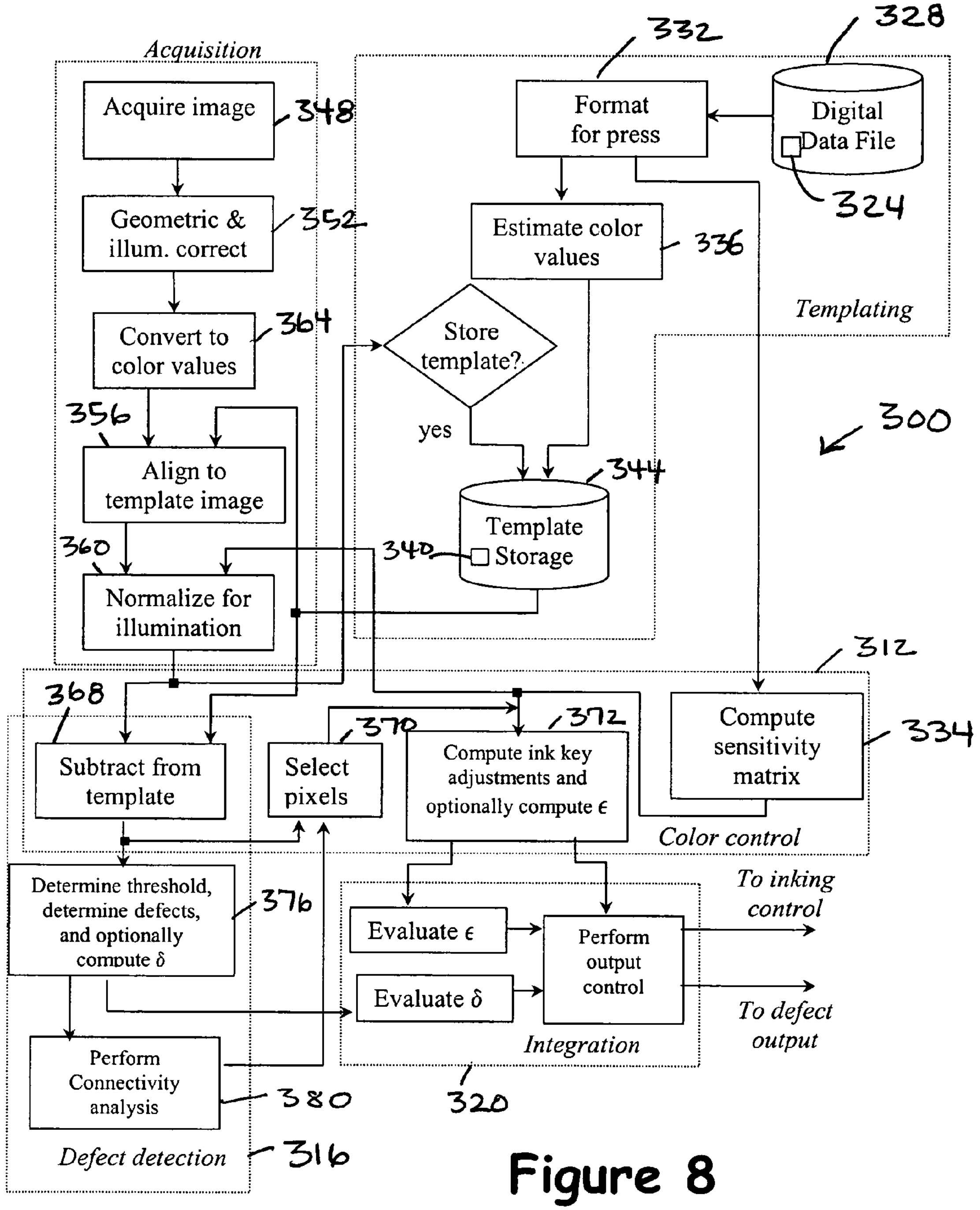
FIG. 8 is a flow chart of a control system.

A flowchart 300 according to the present apparatus and method is shown in FIG. 8. The steps set forth in FIG. 8 are modular in nature and detail one embodiment of the invention. The operation generally includes five processes: templating, acquisition, color control, defect detection and integration. Depending on the application, the operations preferably run on the processor 138, such as a conventional general purpose computer, but can be adjusted to run completely or partially on a digital signal processor, an application specific integrated circuit, specialized digital hardware, pipelined array processors, systolic processors, or the like.

Specifically, FIG. 8 includes a templating subsystem module 304, an acquisition subsystem module 308, a color control subsystem module 312, a defect detection subsystem module 316, and a integration subsystem module 320. Briefly, in the templating process, a preferably digital representation is initially created of what should ideally be printed on the web. This so-called template image is created based on a prepress source of information. The template image could be created from the data files used to create the printing plate, or it could be based on a scan of a proof, for example. When the printed work on the press is of acceptable quality, an acquired image may also be used as the template image. The acquisition process encompasses the collection of an image of a complete repeat of the print, as well as additional processing to bring this image to a standardized form. The color control process, which is preferably a markless system, entails comparison of the currently acquired image against the template image. Based on this comparison, recommendations are made for adjustments of inking levels. These recommendations may be fed to an operator, directly to an inking level actuator, or to an external process which is controlling inking levels via a PID loop, an adaptive control loop, or to some model-based control system, for example. The defect detection process entails comparison of the acquired image against the template image. The purpose of defect detection is to find print defects rather than to adjust inking levels. Therefore, the processing for defect detection after the comparison will differ substantially from the processing after color control. The integration process receives inputs from the color control subsystem and the defect detection subsystem. Based on these inputs, the integration process may choose to enable or disable the action of either the color control subsystem or the defect detection subsystem, or perhaps choose to modify any of the outputs.

In normal operation, the templating process will be the first to occur. This will preferably occur in a computer located off-press, and networked to various printing presses throughout a plant. During the initial makeready impressions, the ink levels will be stabilizing and the inks will be substantially out of register. The integration subsystem module will most likely be informed that a substantial amount of defects have been found as compared to the template image, and that the color control subsystem does not believe that it can adequately correct the color yet. Based on this, the outputs from the defect detection subsystem and from the color control subsystem will be disabled.

Eventually, the inks will all be at some nominal level and registration will be reasonable. At this point, the defect detection subsystem will still see a substantial amount of defects, but the color control system will deem the color substantially correctable. Based on this, the integration subsystem will enable the output of the color control subsystem, but will continue to disable the defect detection subsystem output. The color control subsystem will work to adjust the inking levels on the web to within target tolerances of the colors in the template image. As this happens, the amount of defects detected will be reduced, and the degree of color match will improve.

When the amount of defects and the degree of color match are within a specified tolerance, the integration subsystem module will enable the output of the defect detector subsystem. At this point, the defect detector subsystem will apprise the operator of any defects that have been detected. This may take the form of, for example, an image display with an overlay highlighting the places on the web where appreciable differences occur. These highlighted defects may be used to diagnose the need for further adjustment of color, or may indicate a plate scratch or composition error. These highlighted defects may also indicate inaccuracies in the process by which the appearance of the web is estimated from the prepress information. Therefore, when the press has reached the "color ok" stage, it may be desirable to obtain a more representative image of the print on the web by capturing an image directly from the web. At this point, the operator may choose to replace the template image with an image collected from the web. It is possible to reduce operating tolerances at this time in either of the color control subsystem or the defect detection subsystem.

Turning now to the specifics of each module, in the templating subsystem module 304, a prepress image 324 is first derived from a digital data file 328 that is used to image a printing plate. Some applications may require an entire repeat be stored in the image 324, while other applications may require only critical portions of the repeat be stored. However, when a template image is created from an online image, it may be preferable to store multiple repeats as the template image. Alternatively, the prepress image 324 can also be obtained by scanning a contract proof. Using a contract proof to generate the prepress image 324 is preferred because defects introduced after the proofing stage may be flagged by the defect detection system 316. In addition, the contract proof also has an appearance agreed upon by the printer and the print buyer. Contract proofs typically cover only a single page of a multi-paged repeat. As a result, multiple contract proofs are joined together in mosaic fashion to create an image of the full repeat.

The prepress image 324 format does not always match with that of the scanner assembly 134. Specifically, the pixel size of the prepress image 324 does not usually match the pixel size of the image sensors used in the scanner assembly 134. Therefore, it is generally necessary to resample the prepress image 324 to a pixel size equivalent to the pixel size of the scanner assembly 134 such as in step 332. Alternately, both the prepress image 324 and an acquired image are converted to a lower resolution in order to reduce the computational overhead and memory requirements.

The prepress image 324 and the acquired image may not be in the same color space, and preferably a color space that exhibits a degree of perceptual uniformity, such as CIELAB, is utilized. For example, the prepress image 324 may be in CMYK format, whereas the acquired image may be in RGB format. Thus, it is generally necessary to convert the images to a common color space as in step 336. Given the prepress image 324 as an input, the conversion step 336 effectively determines a press image estimate, that is what the press will produce. A template image 340 is thus obtained, and subsequently stored in template storage 344.

In the acquisition subsystem module 308, images of the web 142 are continuously acquired in step 348, such that an image of every line of every repeat is collected using a line scanner. If the defect detection requirements are stringent, scanning of every portion of the web 142 may be necessary. The acquisition of an individual line may be triggered by pulses from an encoder coupled with the printing press, for example. As images of new lines are being collected, the previously collected lines are processed. The processing includes a correction step 352 for distortions inherent to the image sensor 145 on a line-by-line basis as the lines are collected.

The correction step 352 includes a photometric zero subtraction in which a baseline value indicating an absence of light is subtracted from all the pixels in a line. However, the baseline value generally varies over time due to temperature fluctuations, for example. Updated photometric zeros can be obtained from periodically sampling the line scanner with the illumination disabled, and with the ambient light adequately isolated. Step 352 also corrects geometric distortion, such as the geometric distortion associated with some lens designs. To correct the geometric distortion, for each pixel in the geometrically corrected output line, the graph or formula from the lens design, or the lens empirical measurements can be used to determine the location to retrieve the pixel from the input line. The retrieved location is generally not an integer. Linear interpolation is used to approximate the value to be stored in the geometrically corrected line.

The imaging system as a unit will not typically respond uniformly in all the pixels. This is due to at least three effects. First, the intensity of the illumination may not be completely uniform. Second, due to vignetting, the lens will capture a wider angle of light from the center of the field of view. Third, the sensor itself may not be equally efficient at capturing light in all pixels due to manufacturing imperfections. To correct for such inconsistencies, the image of a line is divided by a correction line collected from a uniform white object. Other types of image that may require corrections include, but not limited to, the effects of nonlinear digitization and of scattered light, for example.

Colorimetric values, such as CIELAB, are used in the preferred embodiment. The conversion from the regular RGB value to the color space or colorimetric values is performed in step 364. In the preferred embodiment, a 9×3 matrix transform is used:

$$\begin{bmatrix} X \\ Y \\ Z \end{bmatrix} = \begin{bmatrix} 0.868 & 0.046 & 0.115 & 0.042 & 0.074 & 0.084 & -0.136 & 0.018 & -0.037 \\ 0.425 & 0.527 & -0.012 & -0.059 & -0.031 & 0.031 & 0.174 & -0.014 & -0.038 \\ -0.017 & 0.064 & 0.976 & 0.031 & -0.003 & 0.000 & -0.039 & -0.054 & 0.039 \end{bmatrix} \begin{bmatrix} R \\ G \\ B \\ R^2 \\ G^2 \\ B^2 \\ RG \\ RB \\ GB \end{bmatrix}, \qquad \text{(E1)}$$

where X, Y, and Z, are the standard precursors to the calculation of CIELAB values.

The translation from RGB values to colorimetric values can be performed in a variety of ways. The coefficients of the transform matrix depend on the specifics of the spectral response of the scanner assembly 134 and the illumination used, as well as the reflectance spectra of the inks printed on the web 142. The transform itself may take any number of forms.

Once step 352 is completed, most of the distortions contributing to the dissimilarities between the acquired image and the prepress image 324 have been corrected. What is not known is the precise registration of the acquired image relative to the prepress image 324. In order to compare the acquired image with the template image 340 in subsequent steps, the two images are aligned in step 356. Specifically, alignment may require buffering from a plurality of lines to potentially all the lines of an entire repeat. A number of buffered lines is preferably stored in a memory. Once a predetermined number of lines from roughly the appropriate area of the image has been stored in the buffer, alignment step 356 takes place.

Alignment of the acquired image to the template image 340 can be performed in a variety of ways well known in the art. For example, fiducial marks can be printed on the web 142 and located. Alternately, alignment without fiducial marks may also be used. The alignment frequency is generally dependent upon how accurate the encoder ticks reflects the actual flow of the web 142. In the preferred embodiment, alignment will be performed once per repeat, although it could be performed multiple times per repeat, or only once per multiple repeats. Note that if the lateral stretch of the web 142 has sufficient variability compared to the pixel size of the scanner assembly 134, it may be necessary to also perform alignment in sections across the web 142.

After the alignment step 356 has been completed, correction for another distortion of the scanner assembly 134 is preferably performed in step 360. Normal fluctuations in the intensity of the illumination of the web 142 will cause an otherwise ideal acquired image to have a different brightness and chroma with respect to the template image 340. Step 360 corrects the illumination intensity by first averaging the intensities of a plurality of preselected areas on the acquired image. Corresponding areas of the prepress image 324 are also averaged. The entire acquired image is subsequently scaled such that the template image average and the acquired image average are the same. Depending on light source stability and the web speed, the normalization process in step 360 may be performed on a line-by-line basis or on a multi-line basis, but preferably on a repeat-by-repeat basis. Furthermore, the pre-selected areas may be user defined or set up to include all the pixels in a single line, multi-line section, or repeat, whether the pixels are inked or non-inked, for example. The pre-selected areas are preferably the non-inked portions of the web 142. Automatic identification of these areas could be based on the prepress information and a sensitivity matrix defined hereinafter.

Once the colorimetric values have been normalized for illumination in step 360, the data is sent to a comparison step 368 which generates results that are shared by both the color control subsystem module 312 and the defect detection subsystem module 316. In step 368, the corrected and color converted acquired image is subtracted from the template image 340.

Referring now to the defect detection subsystem module 316, the process of defect detection begins with the subtraction of the corrected and color converted online image from the template image in step 368. A defect in a pixel is detected in step 376 when a difference between the pixel value on the acquired image and the pixel value on the template image 340 is outside a pre-specified threshold. The threshold may be specified as an absolute difference of either L*, a* or b* that is greater than a predetermined number, for example, 5. Alternatively, the threshold may be specified as a ΔE value that is greater than a second predetermined number, for example, 10. In the preferred embodiment, a CMC color differencing formula is used, with a threshold value determined by the quality requirements of a print job and an ability of the press to maintain the color.

The presence and (x, y) locations of these potential defects may be all that is required for some applications. In this case, the connectivity analysis step 380 will be minimal. The presence or absence of a defect may be used to trigger a mechanism by which the corresponding impression may be marked as defective, or shunted into a different workflow from the non-defective product after the web 142 has been cut into individual signatures. The defect locations may be logged to a data file for statistical process control purposes. Alternately, an acquired image with the defect area highlighted may be displayed to a pressman.

In other applications, further discrimination of defects may be required. In particular, the size or intensity of the defects may be of importance. The size of a defect may be determined by defect or connectivity analysis in step 380. The result of the thresholding in step 376 may be considered as a binary defect image, with a "1" in a pixel indicating a defective pixel, and a "0" in the pixel indicating otherwise. In the connectivity analysis step 380, adjacent defective pixels are joined into a single defect particle. The information in the binary image will thus be reduced to a list of defect particles, each with a plurality of defective pixels.

If it is desired that only defects above a predetermined size be reported, a binary morphological operation such as binary erosion may be used in step 380. The original binary defect image is eroded so that all defects are reduced in size, and only defects that are larger than a single pixel remain. The erosion process may be repeated to erode more of the eroded binary image. Each erosion removes the outer rim of pixels from a defect. If it is desired, for example, that only defects with a radius greater than six pixels be reported, erosion has to be performed six times. At the end of the erosion processes, pixels having a "1" indicate a defect which is larger than the predetermined size. It may then be desirable to refer back to the original binary defect image to locate all the pixels associated with the defect.

The defect locations reported by the defect detection subsystem 316 may be used to decide which pixels are used by the color control subsystem 312. To this end, the color differences computed in step 368 are sent to a pixel selection step 370. The pixel selection step 370 passes only those pixels that have been selected by a combination of the press operator, the original customer of the printed work, and some automated analysis program. Alternately, the pixel selection step 370 may make use of only the pixels in the colorbar such as in a marked color control system. The computational load for the color control subsystem may thus be reduced. Additionally, the pixel selection step 370 may suppress such pixels that are deemed defective in step 380.

The color differences are then used to determine the color error in the color control subsystem module 312 which attempts to minimize the color error by adjusting a set of ink metering devices in step 372. The error minimization process first assumes that for small changes in ink metering, the relationships in equations E2, E3 and E4 are reasonable approximations to the actual relationships between the variables therein.

$$L_p(x, y) = L_o(x, y) + \sum_i k_\Delta(i, j)F(x, y, j)S_L(x, y, i) \tag{E2}$$

$$a_p(x, y) = a_o(x, y) + \sum_i k_\Delta(i, j)F(x, y, j)S_a(x, y, i) \tag{E3}$$

$$b_p(x, y) = b_o(x, y) + \sum_i k_\Delta(i, j)F(x, y, j)S_b(x, y, i) \tag{E4}$$

where, (x, y) represents coordinates of a pixel in the acquired image or the template image 340, $L_o(x, y)$, $a_o(x, y)$, and $b_o(x, y)$ represent the CIELAB values of the online image at location (x, y), $k_\Delta(i, j)$ represents a change in the amount of ink number i (for example, with i=1 being cyan, i=2 being magenta) metered at lateral position j, where j goes from 1 up to the number of ink metering devices across the web 142, F(x, y, j) represents the relative effect that ink metering device j has on pixel (x, y), $S_L(x, y, i)$, $S_a(x, y, i)$, and $S_b(x, y, i)$ are three dimensional sensitivity matrices that estimate the amount of change there will be in L *, a *, and b *, respectively, at a point (x, y) for a unit change in $k_\Delta(i, j)$, and $L_p(x, y)$, $a_p(x, y)$, and $b_p(x, y)$ represent the predicted CIELAB values of the acquired image at location (x, y), after a change in the ink metering as specified by the $k_\Delta$ vector.

Due to the spread of ink by the vibrator rollers, an ink metering device will typically provide ink to a somewhat wider area than the actual width of the ink metering device. As a result, if information of the ink spread is available during the make-ready process, the convergence time can be improved especially when the ink metering devices require large changes. For example, one value for F(x, y, j) is 0.5 for pixels within the width of the ink key metering device, and another value is 0.2 for the pixels in the neighboring areas. The value of F(x, y, j) can be changed at color ok to reflect no ink spread.

Equations E2, E3 and E4 are a linear set of equations in $k_\Delta(i, j)$. To determine the required changes in ink metering in step 372, a residual error as shown in Equation E5 is first set up:

$$\varepsilon = \sum_{x,y} \sqrt{\begin{matrix}[(L_p(x, y) - L_t(x, y))^2 + (a_p(x, y) - \\ a_t(x, y))^2 + (b_p(x, y) - b_t(x, y))^2]\end{matrix}} \tag{E5}$$

where $L_t(x, y)$, $a_t(x, y)$, and $b_t(x, y)$ represent the CIELAB values of the template image 340 at location (x, y). The quantity being summed is the standard color difference between corresponding pixels. The required ink changes are determined by obtaining a vector $k_\Delta(i, j)$ that minimizes the residual error. Alternatively, the changes can be determined from a differencing formula such as the CMC color differencing formula.

This is an overdetermined linear system. It is therefore possible to use standard regression techniques to determine the minimization.

In the preferred embodiment, images will be taken of every impression. In a typical web offset printing press, a change in the ink metering may take hundreds of impressions to be fully expressed. A Proportional-Integral-Derivative ("PID") loop could be tuned to deal with the long delay. The color control subsystem module 312 will preferably wait for a number of impressions after issuing a change in ink metering before requesting a subsequent change. In this way, the computational load on the system is decreased.

The sensitivity matrices, $S_L(x, y, i)$, $S_a(x, y, i)$, and $S_b(x, y, i)$, may be estimated by analyzing the effect of changes in inking levels. In one embodiment, estimates about the ink composition at various points in the impression may also be made based on knowledge of the typical color values for various combinations of inks.

Turning now to the integration subsystem module 320, this module enables or disables the inking control or the defect outputs from the color control subsystem module 312 and the defect detection subsystem module 316, respectively, depending on the outputs of the modules 312, 316. The information from these two modules 312, 316 determines the state of the printing press and also the appropriateness of the enabling and disabling outputs. For example, the defect detection subsystem is preferably disabled if it is determined that the defects found are largely the result of the color being incorrect. An estimate of the time that it will take to correct the color as well as the magnitude of the defects may be used as a basis for disabling the defect detection subsystem. Further, by determining when color is within a given tolerance, it is possible to tighten the defect tolerance since spuriously detected color defects would be eliminated.

The information received by the integration subsystem module 320 from the color control subsystem module 312 may include the residual color error, $\epsilon$ determined from equation E5. The value of $\epsilon$ indicates how close the template image 340 and the acquired image will be once the requested inking change has stabilized on press.

In addition, the information received from the defect detection subsystem module 316 may include the sum of defects, $\delta$. The sum of defects, $\delta$ indicates how close the template image 340 and the current acquired image are:

$$\delta = \sum_{x,y} \sqrt{[(L_o(x, y) - L_t(x, y))^2 + (a_o(x, y) - a_t(x, y))^2 + (b_o(x, y) - b_t(x, y))^2]} \tag{E6}$$

Note that if $k_{\Delta}=0$ in equations E2, E3 and E4, $L_o(x, y)=L_p(x, y)$, $a_o(x, y)=a_t(x, y)$, and $b_o(x, y)=b_p(x, y)$, and hence, $\epsilon=\delta$. Since $\epsilon$ is determined from a minimization process, it follows that $\epsilon \leqq \delta$ will always be the case.

One possible set of rules, for example, for the output control is shown as Table 384 in FIG. 9. Table 384 uses $\epsilon$ and $\delta$, as defined in equations E5 and E6, as inputs respectively. Table 384 also uses "Previous prediction," which indicates a previous value of the residual color error, $\epsilon$, with time scale taken such that any color changes would have stabilized. If the color control was to be disabled at any step, the next value for "Previous prediction" would preferably be set to the current value of the residual color error $\epsilon$.

The rules set may be modified to include more than two values such as, for example, "Small," "Medium," and "Large." The rules may also include a larger number of previous states. Implementation can be based on a state machine, a neural network, or fuzzy logic. Similarly, the rules may be laid out explicitly as a series of "if-then" statements.

The computations of $\epsilon$ and $\delta$, and the application of the rules may be applied based on a full impression. As a result, the enabling or disabling the color control output or the defect detection output is based on the entire impression. Alternately, the enabling and the disabling action may be applied separately to individual alleys, or ink key zones, as required by the application.

Furthermore, the defect detection subsystem 316 also operates to keep the color control subsystem 312 from making decisions simply based on defective pixels. For example, the color control subsystem 312 will be disabled in the event of a blanket wash, or other such severe defect such that only few inked pixels are detected. The integration module 320 may also elect to disable inking control outputs based on whether the compute ink key adjustments module 372 has an adequate pixel count or ratio of allowed pixels to possible pixels. Alternately, the color control subsystem 312 may also be disabled based on a numerical analysis on the stability of the solution of the linear equations representing the system, or a condition number or a singular value decomposition of the relevant matrices of the system. Other severe condition that may disable the color control subsystem 312 includes a startup condition of the printing press. Specifically, the inking levels may be substantially off during the startup of the printing press. When the inking levels are substantially off, the defect detection subsystem 316 will label a large quantity of pixels defective thereby undesirably disabling the color control subsystem 312.

As shown in FIG. 8, the pixel selection module 370 limits the number of pixels that are suppressed to avoid undesirable disabling of the color control subsystem 312. For example, if suppression is required by more than half of the pixels in an acquired image, the pixel selection module 370 then passes along only those pixels with the smallest errors. In another embodiment, the output of the defect analysis module 380 is fed instead to a second compute ink key adjustment module. The second compute ink key adjustment module will perform an actual inking control. In this way, the defect analysis module 380 provides information for true defect suppressions, but not the defects that cover the entire web 142. Furthermore, the initial computation of the original ink key adjustments in module 372 will be made based on all the pixels, except for those requiring suppression for other reasons.

FIG. 8 also shows a single output from the defect detection module 316. Some applications may include more outputs with different criteria. For example, one output may be the data from which visualizations of the defects are constructed. Another output may indicate whether a given impression contains an error sufficiently large to warrant diverting the corresponding impression from the acceptable print.

Sharing of image acquisition and processing by the color control and defect detection control systems of the present invention reduces the overall cost of the control system, reduces maintenance costs, as well as reduces the space needed to house the control system.

The preferred embodiment uses prepress information in advantageous ways. A prepress representation is first used as a template during makeready for both the defect detection and the color control in step 328. The sensitivity matrices are also computed from the prepress information in step 334. Furthermore, areas where there is no ink coverage are determined by analyzing the prepress information in module 316. This, in turn, is used to select pixels to be used for normalization of illumination levels.

In the absence of the prepress information, an alternative embodiment that does not require the prepress information can be used. For example, the acquired image corrected in the acquisition module 308 can be used as a template. During makeready, the defect detection subsystem module 316 will generally not be used, and the color control subsystem module 312 may be either disabled or based solely upon color patches within a color bar. Therefore, there will be enough time for an adequate acquired image to be acquired and stored as a template image 340.

Figure 10:
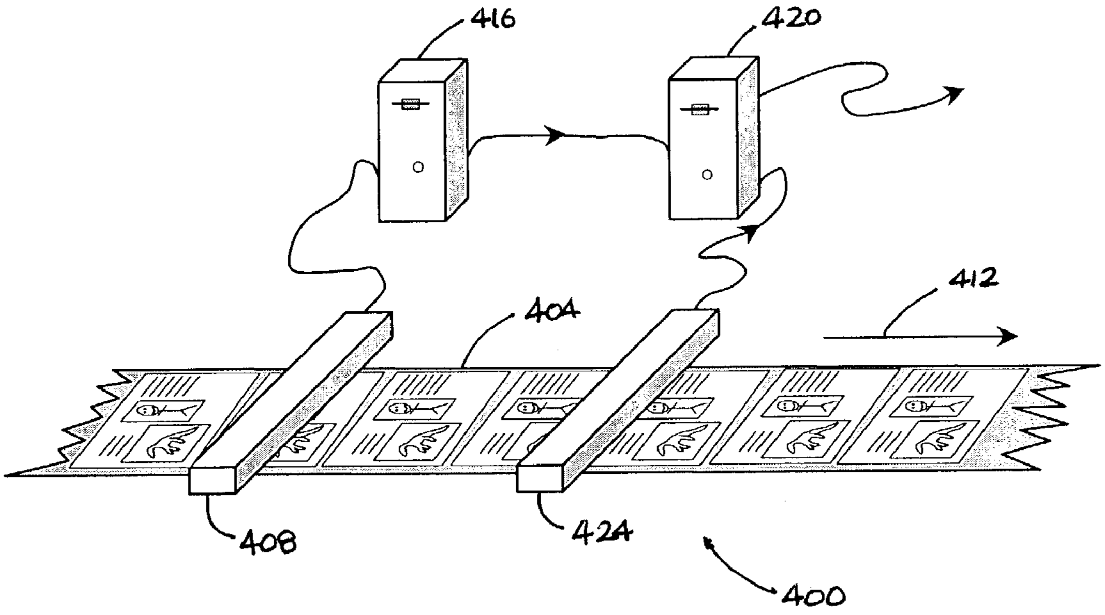
FIG. 10 is a perspective view of a portion of printing press including an alternative embodiment of the control system.

FIG. 10 illustrates an alternative embodiment of a control system 400 according to the present invention. A printed web 404 moves passes a defect detection system scanner 408 in a direction indicated by arrow 412. The defect detection system scanner 408 contains an array of lighting elements, such as those described earlier, and an array of image sensors. The lighting elements and the image sensors are generally arranged laterally across the scanner 408 and perpendicular to the direction of the moving web 412. Depending on the application, the scanner 408, the lighting elements, and the image receptors can be arranged differently.

The defect detection system scanner 408 scans to acquire image data representative of the printed web 404. The scanned image data is subsequently transferred to a defect detection system processor 416 for further processing including a comparison of the acquired image with a template image stored in the processor 416. All the discrepancies between the template image and the acquired image that are outside of some predetermined threshold or tolerance are considered as defects, and locations at which defects are detected are also identified. The defect detection system processor 416 then transfers the defect locations to a color control system processor 420.

After the web 404 has moved past the defect detection system scanner 408, the web continues to move in the same direction 412. As the web 404 moves below the color control system scanner 424, the color control system scanner 424 acquires image that is representative of the printed web 404. Similar to the defect detection system scanner 408, the color control system scanner 424 typically contains an array of lighting elements and an array of image receptors.

The color control system scanner 424 passes the image data to the color control system processor 420 for further processing. Typical processing includes color value conversion which converts the image data into its corresponding color values for an individual pixel or a group of pixels. Other processing includes assembling the image data into a plurality of lines and aligning the lines with a color control image template.

Furthermore, if the defect detection system processor 416 detects no defect with a predetermined number of lines, the color control system processor 420 performs only a comparison between the color values and the color control image template. When a difference is detected by the color control system processor 420, changes in inking level are generated and sent to a press interface.

It should be noted that preferably, the color control subsystem 312 of the present invention is of the markless color control type. However, the invention can be utilized with conventional color patch color control. Furthermore, depending on application, the present invention allows for ink key zone control and monitoring as well as the control and monitoring of the whole web.

Various features and advantages of the invention are set forth in the following claims.

What is claimed is:

1. A method of coordinating the use of a color control system and a defect detection system on a printing press having a plurality of ink key zones and printing using a plurality of ink colors, the method comprising:

acquiring image data from a printing press, determining an actual color difference between the acquired image data and template image data representative of a desired image for each of a plurality of pixels, summing the actual color differences of the plurality of pixels to obtain a sum of defects, computing ink key adjustments for each ink key zone and for each color from the actual color differences, computing predicted image data from the ink key adjustments, determining a predicted color difference between the predicted image data and the template image data for each of the plurality of pixels, summing the predicted color differences of the plurality of pixels to obtain a residual error, and enabling and disabling the outputs of the defect detection system based on the sum of defects and the residual error.

2. The method of claim 1, wherein the sum of defects is categorized as large or small, the residual error is categorized as large or small, and the enablement and disablement of the outputs of the defect detection system are based on the categorizations of the sum of defects and the residual error.

3. The method of claim 2, wherein the outputs of the defect detection system are disabled when the sum of defects is large and the residual error is small.

4. A method of coordinating the use of a color control system and a defect detection system on a printing press having a plurality of ink key zones and printing using a plurality of ink colors, the method comprising:

acquiring image data from a printing press, determining an actual color difference between the acquired image data and template image data representative of a desired image for each of a plurality of pixels, summing the actual color differences of the plurality of pixels to obtain a sum of defects, computing ink key adjustments for each ink key zone and for each color from the actual color differences, computing predicted image data from the ink key adjustments, determining a predicted color difference between the predicted image data and the template image data for each of the plurality of pixels, summing the predicted color differences of the plurality of pixels to obtain a residual error, and enabling and disabling the outputs of the color control system based on the sum of defects and the residual error.

5. The method of claim 4, wherein the sum of defects is categorized as large or small, the residual error is categorized as large or small, and the enablement and disablement of the outputs of the color control system is based on the categorizations of the sum of defects and the residual error.

6. The method of claim 4, further including determining a previous residual error, and enabling and disabling the outputs of the defect detection system and the color control system based also on the previous residual error.

7. The method of claim 6, wherein the sum of defects, the residual error, and the previous residual error are each categorized as large or small, and the enablement and disablement of the outputs of the defect detection system and the color control system are based on the categorizations of the sum of defects, the residual error, and the previous residual error.

8. The method of claim 7, wherein outputs of the color control system are disabled when the sum of defects is large and the previous residual error is small, or when the residual error is large.

9. A method of coordinating the use of a color control system and a defect detection system on a printing press having a plurality of ink key zones and printing using a plurality of ink colors, the method comprising:

acquiring image data from a printing press, determining an actual color difference between the acquired image data and template image data representative of a desired image for each of a plurality of pixels, summing the actual color differences of the plurality of pixels to obtain a sum of defects, computing ink key adjustments for each ink key zone and for each color from the actual color differences, computing predicted image data from the ink key adjustments, determining a predicted color difference between the predicted image data and the template image data for each of the plurality of pixels, summing the predicted color differences of the plurality of pixels to obtain a residual error, enabling and disabling the outputs of the defect detection system based on the sum of the defects and the residual error, and enabling and disabling the outputs of the color control system based on the sum of defects and the residual error.

10. The method of claim 9, further including determining a previous residual error, and enabling and disabling the outputs of the defect detection system based also on the previous residual error.

11. The method of claim 9, wherein the sum of defects, the residual error, and the previous residual error are each categorized as large or small, and the enablement and disablement of the outputs of the defect detection system are based on the categorizations of the sum of defects, the residual error, and the previous residual error.

12. The method of claim 9, wherein the outputs of the color control system are disabled when the sum of defects is large and the previous residual error is small, or when the residual error is large; and wherein the outputs of the defect detection system are disabled when the sum of defects is large and the residual error is small.

13. A method of coordinating the utilization of a color control system and a defect detection system on a printing press, the method comprising:

storing template image data having values in a predetermined color space, acquiring an image from a web in the printing press and generating acquired image data having values in the same predetermined color space, determining an actual color difference between the acquired image data and the corresponding template image data for each of a plurality of pixels, summing the actual color differences of the plurality of pixels to obtain a sum of defects, computing ink key adjustments from the actual color differences, computing predicted image data in the same predetermined color space from the ink key adjustments, determining a predicted color difference between the predicted image data and the template image data for each of the plurality of pixels, summing the predicted color differences of the plurality of pixels to obtain a residual error, enabling and disabling the outputs of the defect detection system based on the sum of defects and the residual error; and enabling and disabling the outputs of the color control system based on the sum of defects and the residual error.

* * * * *